United States Patent [19]

Binversie et al.

[11] Patent Number: 5,170,752
[45] Date of Patent: Dec. 15, 1992

[54] THERMOSTAT COVER WITH SNAP-IN NIPPLE

[75] Inventors: Gregory J. Binversie, Grayslake; David W. Mate, McHenry, both of Ill.

[73] Assignee: Outboard Marine Corporation, Waukegan, Ill.

[21] Appl. No.: 841,048

[22] Filed: Feb. 25, 1992

[51] Int. Cl.⁵ .............................................. F01P 7/14
[52] U.S. Cl. ................................ 123/41.08; 236/34.5; 285/162; 285/184
[58] Field of Search .................. 123/41.08, 41.09, 41.1; 236/34, 34.5; 285/158, 162, 179, 184, 921

[56] References Cited

U.S. PATENT DOCUMENTS

| | | | |
|---|---|---|---|
| 3,381,122 | 3/1982 | Obernberger | 123/41.09 |
| 3,918,418 | 11/1975 | Horn | 123/41.08 |
| 4,128,264 | 12/1978 | Oldford | 285/921 |
| 4,432,042 | 11/1982 | Brown | 123/41.08 |
| 4,881,155 | 6/1987 | Hundertmark | 123/41.08 |
| 4,885,666 | 6/1989 | Watanabe et al. | 123/41.74 |
| 4,949,230 | 8/1991 | Neal et al. | 123/41.08 |
| 5,048,468 | 9/1991 | Broughton et al. | 123/41.74 |

FOREIGN PATENT DOCUMENTS 3212142 2/1983 Fed. Rep. of Germany ...... 285/162

Primary Examiner—Noah P. Kamen
Attorney, Agent, or Firm—Welsh & Katz

[57] ABSTRACT

A thermostat cover assembly for a external combustion motor of the type which has a thermostat control valve with a thermostatically actuated spring for controlling the flow of coolant through the cylinder bank of the motor to maintain a predetermined coolant temperature, the motor having an outer protective cowling. The thermostat cover includes at least one intake nipple having a first end and a second end. The nipple is configured for releasably accepting an intake hose. The thermostat cover further includes a mounting plate having a front side and a rear side. The mounting plate is configured to receive the intake nipple so that the nipple may be engaged to the plate in a plurality of specified orientations. The plate also has nipple fastening means for releasably securing the nipple to said plate.

20 Claims, 3 Drawing Sheets

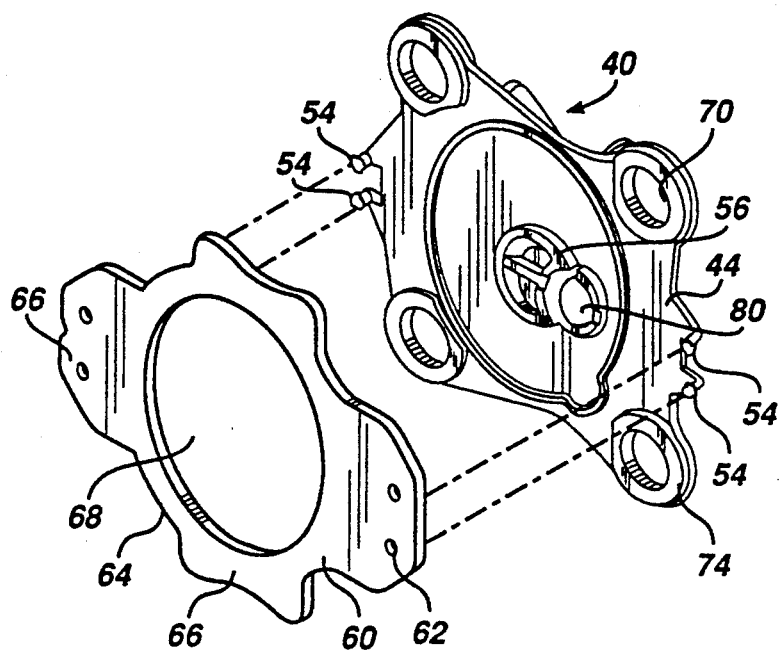
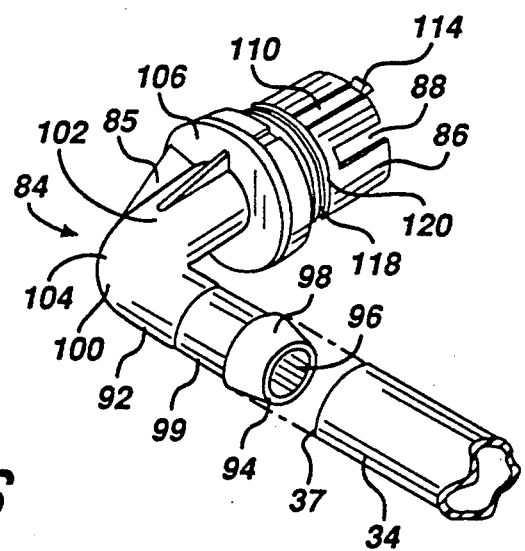
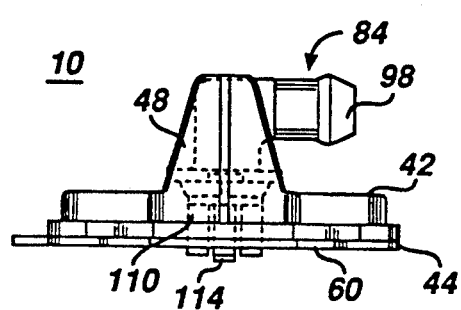

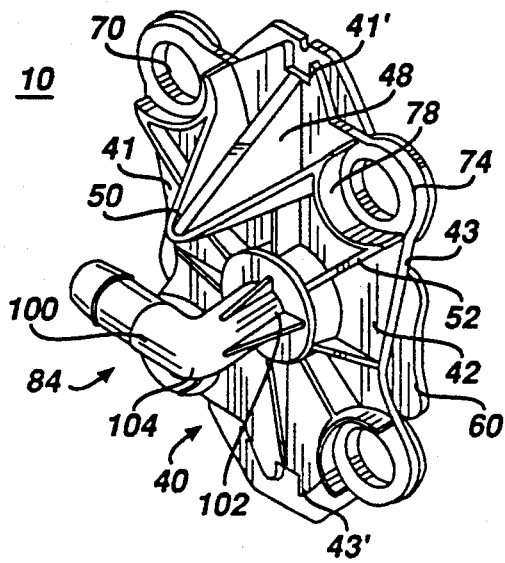
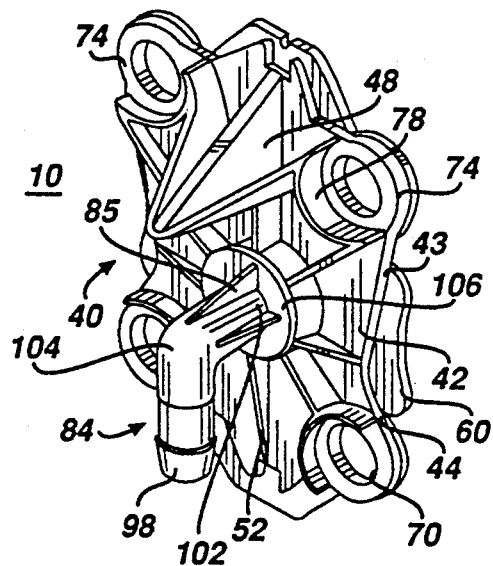
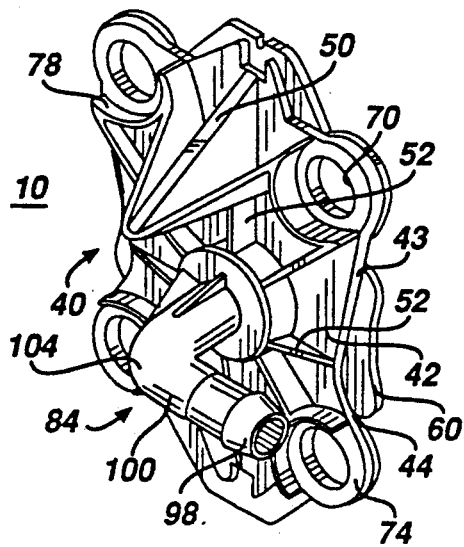

THERMOSTAT COVER WITH SNAP-IN NIPPLE

The present invention relates generally to a thermostat cover with a snap-in nipple configured for use in connection with internal combustion motors having thermostat control valves for maintaining a desired temperature within the motor assembly.

BACKGROUND OF THE INVENTION

Cooling systems for engines, such as internal combustion motors, typically include thermostatically controlled valves which are designed to control the amount of coolant flow through a cylinder assembly of an engine. These thermostat valves are usually set to be actuated at a predetermined temperature, at which time the valve opens allowing coolant to flow from the coolant supply through to the engine block to maintain a desired engine temperature. The coolant, usually water, flows from the coolant source through the thermostat and is dumped into the cylinder assembly. The thermostat valves are typically attached to the cylinder block and provide fluid communication between the intake assembly and the coolant jacket or cylinder block of the engine.

The intake supply of coolant is usually fed by way of an intake hose or other tubing connected to a coolant supply, such as directly into the body of water, if what is being utilized is a typical marine engine. The coolant is pumped up into the engine block and administered through the cylinder assembly or coolant jacket when the thermostatically controlled valve opens to allow flow of the coolant. Often, these thermostat valves include some type of cover or plate which fits over the cylinder head and encloses the thermostat valve.

Typically, the cover functions as a passageway or as an entryway for the coolant into the cylinder block. Moreover, the cover functions to protect the thermostat valve from debris or unwanted foreign matter that could damage and could also cause damage to the cylinders or the engine block. These covers can be damaged when a protective cowling assembly of the engine is removed and replaced during the servicing. Also, these covers usually include an intake assembly that can be easily damaged or that can obstruct the removal and replacement of the cowling assembly. Additionally, currently available covers are not designed to be removably attached to the thermostat assembly to simplify the application or removal of the thermostat assembly from the cylinder head. Known currently available covers are not attached to the thermostat valve, and consequently when the user attempts to service the thermostat valve or cylinder, removing the cover can result in the thermostat valve falling to the ground or overboard. Furthermore, known currently available covers are configured with a fixed inlet assembly that cannot be selectively positioned or directed according to the layout of the thermostat valves on the engine block.

Also, known current thermostat covers require costly manufacturing of two different covers, with each cover being configured for application to either the port or starboard cylinder bank. Most available thermostat covers include an intake assembly that is in a fixed or permanent position. Typically a bore is machined to accept a threaded nipple, which is threaded thereon to provide the nipple in a specified orientation. Thus, the currently available nipple and cover assembly limits the positioning of the distal end of the nipple to one orientation. Other available covers may actually include the nipple as a fixed or integral part of the cover itself, which further limits its application.

Accordingly, it is an object of the present invention to provide a thermostat cover for an internal combustion motor which can be removably attached to the thermostat valve of the cylinder block, which is manufactured of a rigid but lightweight and cost effective material, and which is designed to protect the intake assembly from damage caused by removal and replacement of the engine cowling.

It is a further object of the present invention to provide a thermostat cover having an opening adapted to releasably receive a snap-in nipple in a plurality of selectable orientations.

It is yet another object of the present invention to provide a thermostat cover with a formation adapted to allow attachment of the cover to the thermostat valve assembly to facilitate the application and the removal of the plate and thermostat valve assembly with the cylinder head.

BRIEF DESCRIPTION OF THE DRAWINGS

Other features and advantages of the present thermostat cover with snap-in nipple will become apparent to those skilled in the art upon review of the following detailed description, claims and drawings, in which:

FIG. 3 is a rear perspective view of the present thermostat cover with snap-in nipple of FIG. 1;

FIG. 4 is a perspective view of the snap-in nipple of FIG. 1;

FIGS. 5A, 5B and 5C are frontal perspective views showing the alternative positions of the snap-in nipple once applied to the cover; and FIG. 6 is a side view of the present thermostat cover with snap-in nipple of FIG. 1.

DETAILED DESCRIPTION OF THE PREFERRED EMBODIMENT

In accordance with the present invention, all of these objects as well as others not herein specifically identified, are achieved generally by the present thermostat cover with snap-in nipple. Broadly stated, the present thermostat cover includes at least one intake nipple having a first end and a second end, where the first end is configured to releasably accept an intake hose that supplies a coolant liquid. Further, the present invention includes a mounting plate having a front side and a rear side. The mounting plate is configured to receive the intake nipple in a plurality of selectable orientations, namely, to allow the plate to be used in either a starboard or port orientation. The mounting plate has nipple securing means for securing the second end of the nipple to the plate in the selected orientation.

The rear side of the mounting plate includes gasket retaining means for releasably accepting a flexible sealant gasket to prevent leakage and enable a more secure mounting of the thermostat cover to the mouth of the cylinder head. Additionally, the present thermostat cover with snap-in nipple includes an integrally formed flange or protective wall which protects the mounting plate and intake assembly, namely the nipple, from damage during removal and replacement of the protective cowling of the engine. The present thermostat cover and snap-in nipple is also adapted to be operationally and releasably connected to a thermostatically actuated valve assembly mounted into the cylinder head to facilitate application and removal of the valve assembly with the cylinder head.

Figure 1:
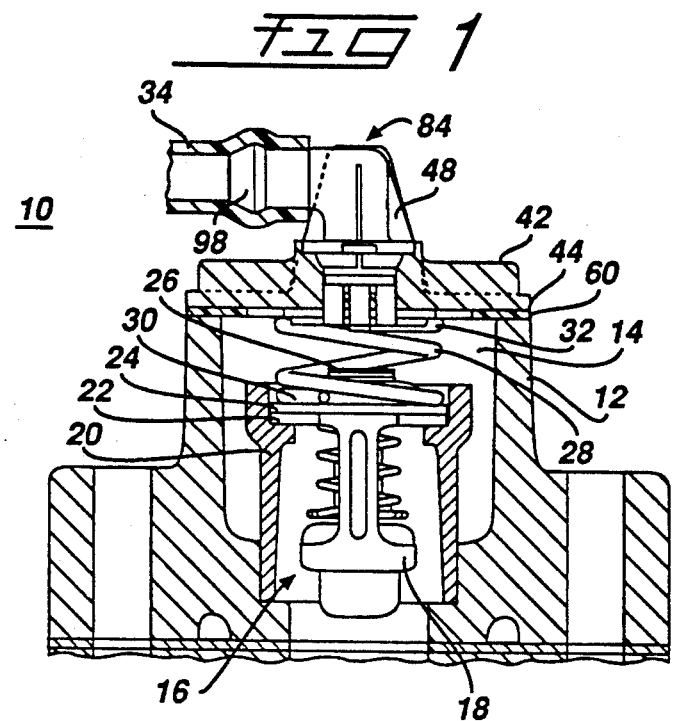
FIG. 1 is a cross-sectional view of the present thermostat cover with snap-in nipple shown mounted onto a cylinder head assembly.

Referring to FIG. 1, the present thermostat cover with snap-in nipple is generally designated at 10. It is anticipated that the cover 10 will generally be utilized with an internal combustion engine, such as those typically known and used in marine propulsion devices. As shown, the present thermostat cover with snap-in nipple 10 is securely mounted onto a typical cylinder head 12 of a cylinder bank. Within the cylinder head 12 is a core 14 into which a typical thermostatically actuated valve assembly or thermostat valve assembly 16 is attached.

It is contemplated that the chosen valve assembly 16 will have a thermostat 18, which is configured to be actuated when a predetermined engine temperature is achieved. Further, the thermostat valve assembly 16 can include a thermostat housing or sleeve 20 which is set down into the cylinder head and has an upper ledge 22 upon which a sealing gasket 24 is positioned. The thermostat assembly 16 has a seat subassembly 26 which is configured to retain a thermostat spring 28. The thermostat spring 28 has a lower end 30 which is positioned and secured upon seat subassembly 26. The thermostat spring 28 also has an upper end 32 which is secured to a formation on the thermostat cover 10. The entire valve assembly 16 is configured so that it can be pressed into place within the core 14 and thereafter further secured into place when the thermostat cover 10 is mounted to the cylinder head 12.

In a typical marine engine, once the propeller is emersed in water and the engine is running, a water pump draws cool water up through a supply conduit, such as through a flexible intake hose 34 and through an inlet assembly of the cylinder 12. The engine may be constructed with an internal cooling jacket (not shown) through which the coolant travels in order to maintain the desired engine temperature. Alternatively, coolant may be dumped directly into other coolant assemblies direct within the cylinder head 12 when the coolant flow is actuated.

Generally, the ingress and egress and overall amount of coolant flow is controlled by the thermostat valve assembly 16 shown in FIG. 1. The present cover 10 is secured to the thermostat valve 16 via the thermostat spring 28, so that when the thermostat valve 16 is actuated, coolant is brought through the thermostat cover 10 and intake assembly and into the cylinder head 12. Secondly, the cover 10 functions to protect the thermostat valve assembly and components of the engine block, namely the cylinders, from damage or excessive wear by not allowing debris, dirt or other damaging particles from entering the cylinder assembly. Thirdly, since the cover 10 is connected to the spring 28, which is connected to the thermostat valve assembly 16, these individual components form a single unit that facilitates application and removal of the thermostat valve assembly 16 with the cylinder head 12.

Figure 2:
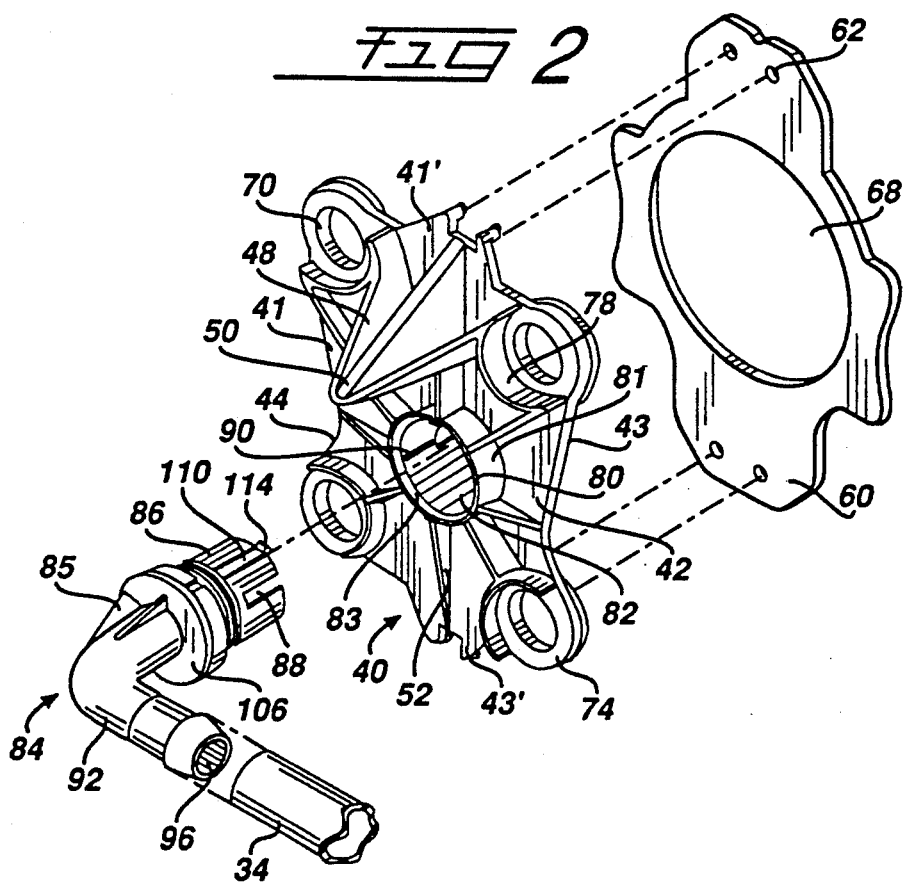
FIG. 2 is an exploded perspective view of the present thermostat cover with snap-in nipple of FIG. 1.

More particularly, the cover 10 as shown in FIG. 2, consists of a central body portion, or mounting plate 40. It is preferred that the mounting plate 40 be manufactured using injection molded plastic techniques. Alternatively, the plate 40 can be made of any other sufficiently rigid and permanent material. It will be appreciated that the plate 40 must be sufficiently rigid to withstand cracking or separating when in use. Particularly, the plate 40 must be able to withstand the high temperatures of an engine without melting, collapsing or otherwise deforming.

The mounting plate 40 should be dimensioned according the particular configuration of the cylinder head 12, and may include tapered sides 41 and 43 and opposing ends 41' and 43'. It should be understood that the particular dimensions of the plate 40 will depend on the configuration of the cylinder head 12, but in all cases the plate 40 should be designed to completely cover and securely sit upon the cylinder head 12 without disturbing or obstructing the flow of the coolant or the working of the various other parts of the engine.

The plate 40 has a front side 42 and a rear side 44. The front side 42 has an integrally formed protective flange 48. The protective flange 48 is shown throughout the several figures as a curved, generally triangularly shaped partition constructed with a central support structure or spine 50 that provides additional strength to the flange 48. Alternatively, the flange 48 may be configured with respect to the type of cowling or cylinder head 12 to which the cover 10 will be assembled. The flange 48 is intended to protect the cover 10 and the intake assembly, and particularly the nipple 84, from damage during removal or replacement of an engine cowling. The plate 40 also has a plurality of integrally formed strengthening walls 52 on its front side 42, which are configured and arranged to add rigidity and strength to the plate 40.

As is shown most clearly in FIG. 3, the rear side 44 of the plate 40 has two significant formations integrally formed thereon. First, the rear side 44 includes a gasket fastening means 54 for fastening a flexible sealing gasket 60 onto the cover 10. As shown in FIG. 3, the gasket fastening means is preferably a plurality of integrally formed mounting posts 54 that extend outwardly from the rear side 44 of the plate 40. Four mounting posts 54 are provided which are configured and arranged as part of the rear side 44 of the plate 40 to mate with complimentarily formed apertures 62 formed through the gasket 60. It should be understood that the present thermostat plate 10 does not necessarily require the addition of a gasket 60. The gasket 60 is an optional feature that aids in preventing leakage of coolant, as well as enable the cover 10 to be more securely mounted onto the mouth of the cylinder head 12.

The gasket 60 will typically be made of a durable flexible rubber-like material which is generally known to be used for gaskets of this type. Furthermore, to provide a better fitting seal, which will not become dislodged within the cylinder core 14 and obstruct the passage of the coolant, the outer perimeter 64 of the gasket 60 should be dimensioned to correspond with the dimensions of plate 40 and more particularly to sufficiently match the dimensions of the rear side 44. As shown in FIG. 3, the gasket 60 may also include side tabs 66 to facilitate removal of the gasket 60 from the plate 40 or from the cylinder 12. The gasket 60 also includes an opening 68 provided to allow the uninterrupted flow of the coolant through the cover 10.

Secondly, the rear side 44 of the plate 40 includes thermostat spring engagement means such as a projecting ring 56 for engaging the upper end 32 of the thermostat spring 28. It is preferred that the engagement means be integrally formed onto the rear side 44 of the plate 40. As shown in FIG. 3, projecting ring 56 is dimensioned and arranged to engage the second end 32 of the spring 28 with a snap together fit. Hence, the spring 28 functions as a connection between the cover 10 and the thermostat valve 16. It is contemplated that other formations designed to retain thermostat spring 28, such as a plurality of concentric rings or lugs or a recessed cavity, can be used. Thus, the second end 32 of the spring 28 is engaged to the plate 10, while the first end 30 is attached to the thermostat 18 such as at seat subassembly 26.

Accordingly, an important feature of the present cover 10 is that the thermostat valve assembly 18, the thermostat spring 28, cover plate 40, gasket 60 and nipple 84 form a unit that can be positioned onto the cylinder head 12 and subsequently pressed securely into the thermostat sleeve 20 within the cylinder core 14. An important advantage of the present cover 10 is that it simplifies power head assembly in the production plant since the entire unit consisting of the thermostat valve assembly 18, thermostat spring 28, cover plate 40, gasket 60 and nipple 84 can be mounted to the cylinder head 12 at one time. Additionally, because the components of the present cover 10 are configured to cooperate and form a single unit, the end user is also aided in servicing or cleaning the thermostat 18 by preventing the thermostat 18 from possible damage or loss by falling out of the core 14. Accordingly, not only is the present cover 10 provided with a selectively positioned nipple 84, but the cover 10 is also designed to simplify the attachment of the thermostat valve 16 into the cylinder 12.

As is shown most clearly in FIGS. 2 and 3, the plate 40 also includes fastening means for fastening the plate 40 to the cylinder head 12. It is contemplated that the fastening means will be a plurality of apertures 70 formed through the plate 40 at corners, or end sections 74. As shown, the apertures 70 are configured to accept commonly used fasteners, such as screw bolts, securing pins and the like. Also, to protect the fasteners utilized, semi-circular fastener walls 78 are formed integrally with the front side 42 of the plate 40. Most importantly, regardless of the fastening means utilized, the securing means used must be configured to correspond with the specific cylinder head 12. In other words, since the fastening means are illustrated as apertures 70 configured to accept screw bolts and the like, there must be bores or other corresponding surface structures that align with the apertures 70, or other fastening means, that will accept the type of fastening means used. It should therefore be understood that the particular type of fastening means utilized can be varied without departing from the principles and objects of the present invention.

The plate 40 also includes nipple fastening means configured as a centrally located bore 80 which extends from the front side 42 through the body of the plate 40 and out the rear side 44. The bore 80 may include an annular outer wall 81 that extends above the surface of the front side 42 of the plate 40. The bore 80 has an inner surface 82 which may be a smooth or threaded surface. Further, the bore 80 may include a shoulder formation forming a seat 83. Other nipple securing means can also be utilized without departing from the basic principles of the present invention. As shown, the bore 80 is centrally located, but certain applications of the present cover 10 may dictate that the bore 80 be formed at other points along the surface of the cover 10. However, it should be clear that the nipple securing means must be configured to correspond with the specific dimensions of the nipple which it is to receive. Variations on the shape of the bore 80 or location of the bore 80 may be required for specific applications of the cover 10 or for different styles of nipples that may be chosen.

The snap-in intake nipple 84, here shown in FIG. 2 and FIG. 4, is a rigid, one-piece assembly, preferably manufactured using injection molded plastic techniques. The nipple 84 can be formed with a plurality of integral reinforcing walls 85 that provide strengthening support. The nipple 84 has a securing end 86 which is configured to engage the nipple securing means or bore 80. The securing end 86 also has configured at its furthermost end snapping means (best seen in FIGS. 2 and 5), incorporating ribs 110, with snapping ledges 114, that are configured to slide through the bore 80 and lock up against the rear side 44 of the plate 40.

The securing end 86 of the nipple 84 may further include at least one notch 88 that matingly engages at least one lug 90 extending radially from the inner surface 82 of the bore 80 to provide a more secure fit between the nipple 84 and the bore 80. It should be understood that regardless of the structures formed in the inner surface 82, the bore 80 must be dimensioned to releasably and slidably accept the securing end 86 of the nipple 84.

The nipple 84 also has a distal or open end 92 opposite the securing end 86, which provides access to an inner channel 96. The open end 92 includes a mouth 94. The inner channel 96 runs through the nipple 84 and functions as a conduit for the flow of coolant from the intake hose 34 through the bore 80 and onto the cylinder head 12. The open end 92 of the nipple 84 includes hose retaining means for retaining an end 37 of the intake hose 36. Preferably, the hose retaining means will be configured as an annular rim or ridge 98 integrally formed at the mouth 94 of the nipple 84.

The annular rim 98 must be dimensioned to provide a sufficient frictional engagement force between the intake hose 36 and the nipple 84 such that when the flow of water is restricted or halted and pressure accumulates in the intake hose 36, the intake hose 36 does not become dislodged. Similarly, the annular rim 98 must provide a sufficient frictional engagement force to compensate for the expansion of the intake hose 36 due to heat or water pressure within the intake hose 36. To increase the engagement strength of the intake hose 36 to the nipple 84, a radial groove 99 can be formed at the open end 92 above the mouth 94. Clearly, it can be anticipated that a locking ring or other clamping device can be utilized to provide a more secure retainment of the intake hose 36 onto the open end 92 of the nipple 84.

Referring now to FIG. 4 where there the constituent parts of the nipple 84 are shown most clearly. The nipple includes a first section 100 and a second section 102 connected at a common elbow joint 104. When the nipple 84 is properly secured to the plate 40, the second section 102 is generally at a right angle or perpendicular with respect to the plate 40. The second section 102 includes the securing end 86 that is snap-fit to the plate 40 in conjunction with fastening means 80. The first section 100 includes the open end 92 that provides engagement and fluid communication with the intake hose 36. The first section 100 is generally connected at the elbow 104 at a right angle with respect to the second section 102, and will be substantially parallel to the plate 40 when the nipple 84 is secured thereto. Hence, the elbow 102 is essentially the vertex between the first and second sections 100 and 102.

An important advantage of the present thermostat cover 10 is that it is designed for application to the cylinder head 12 in a plurality of selectable orientations. Typically, if the cover 10 is to be utilized on a marine engine, then the plate 40 with the nipple 84 can be mounted to a cylinder head 12 in either a starboard or port orientation. Consequently, the necessity of manufacturing two different cover plates with different nipple orientations is eliminated.

As shown in FIGS. 5a, 5b, and 5c, an important feature of the present cover 10 is that the nipple 84 can be inserted and secured to the plate 40 in at least three different orientations. First, as shown in FIGS. 5a and 5c, the nipple 84 can be inserted and snap-fit or otherwise secured to the plate 40 such that the open end 92 points downwards or upwards with respect to the flange 48. Similarly, in FIG. 5b, the nipple 84 can be snap-fit or otherwise secured onto the plate 40 with the open end 92 pointed away from the flange 48. Additionally, since the nipple 84 is removable, it can be re-orientated from a previously chosen orientation to a different orientation relatively easily and without damage to the cover 10 or nipple 84. It is anticipated that the nipple 84 can be positioned and secured axially with respect to the bore 80 at numerous other locations according to the desired application of the plate 10.

To further insure the retainment of the nipple 84 onto the plate 40, While also providing a seal between the nipple 84 and the bore 80, the nipple 84 may include an annular sleeve 106 integrally configured at a midpoint along the second section 102. The sleeve 106 is configured and arranged to slide over and engage the annular wall 81 and abut the seat 83 of the bore 80. The sleeve 106 is intended to prevent the nipple 84 from re-orientating itself or unintentional rotation about the axis of the bore 80 during use.

An important feature of the present cover 10 is that the nipple 84 can be easily snapped onto the plate 40 in a plurality of selectable orientations. The snapping means or snap-fit is preferably effectuated with a plurality of retractable ribs formed on the second section 102. The ribs 110 have snapping ledges 114 integrally formed at there distal ends. The retractability of the ribs 110 allows the ledges 114 to bend inward while the securing end 86 is being plugged into the bore 80. Once the ledges 114 are pushed fully through the length of the bore 80, the ledge 114 can fully extend and engage the rear side 44 of the plate 40.

Lastly, the nipple 84 can include an O-ring seal 118 which fits into an O-ring cavity 120 formed between the sleeve 106 and the securing end 86 of the nipple 84. The O-ring seal 118 is axially dimensioned to extend a sufficient amount above the surface of the second section 102 of the nipple 84 such that the washer 112 sealing contacts the inner walls 81 of the bore 80. As shown in FIG. 6, the present thermostat cover 10 with snap-in nipple is shown fully assembled, with the optional gasket 60, ready for attachment to the threaded spring 28 and for mounting onto the cylinder head 14.

In use, the present cover 10, will have the nipple 84 selectively attached to the plate 40 in the desired orientation. Typically, the orientation selected will correspond to whether the cover 10 is to be used in a starboard or port orientation on the cylinder bank of the engine. The intake hose 36 Will be connected to and in fluid communication with nipple 84 to provide the coolant supply. As the engine temperature increases, the thermostat valve 16 will actuate at a predetermined temperature to cause the coolant to flow into the cylinder assembly until the preferred engine temperature is attained. An important advantage of the present thermostat cover with snap-in nipple is that it simplifies powerhead assembly since the thermostat valve 16, thermostat 18 and plate 10 can be assembled into the cylinder core as a unit.

At the production plant, the thermostat 18 can be attached to thermostat spring 28, which is in turn attached to the rear side 44 of the plate 40 to form a single unit that can be mounted to the cylinder head 12. Another important improvement of the present cover 10, and particularly the nipple 84, is that the protective flange 48 is designed to protect the nipple 84 from damage during operation and use of the motor to which it is attached. Accordingly, the present cover 10 is also a cost efficient improvement for the user, because the possibility of damage to the plate 10 or nipple 84 is greatly reduced. Additionally, the protective flange 48 will allow the user to more easily fit the outer protective cowling back onto the motor after removal.

From a manufacturing standpoint, the present cover 10 increases efficiency at the production plant, since the cover 10 allows the thermostat valve 16 and thermostat 18 to be assembled into the cylinder head 14 as a unit. More importantly, because the nipple 84 can be selectively secured to the cover 10 in multiple orientations, the necessity of forming different covers for each unique application is eliminated. Furthermore, the present cover 10 and nipple 84 can be made from less costly injection molded plastic techniques because the nipple 84 is snapped to the cover 10. Similarly, because the nipple 84 is snapped into the cover 10, time consuming and expensive machining to create a threaded bore to accept a threaded nipple in only one orientation is eliminated. Finally, the present cover 10 and nipple 84 are designed to provide a more durable and tighter fitting seal between the components than current tapered pipe threaded seals.

While various embodiments of the present invention have been shown and described, it should be understood that various alternatives, substitutions and equivalents can be used, and the present invention should only be limited by the claims and equivalents thereof.

Various features of the present invention are set forth in the following claims.

What is claimed is:

1. A thermostat cover assembly for an internal combustion motor of the type which has a thermostat control valve with a thermostatically actuated spring for controlling the flow of coolant through the cylinder bank of the motor to maintain a predetermined coolant temperature, the motor having an outer protective cowling, the thermostat cover comprising:
   at least one intake nipple having a first end and a second end, said nipple configured for releasably accepting an intake hose;
   a mounting plate having a front side and a rear side, said mounting plate configured with means for selectively receiving said intake nipple so that said nipple may be engaged to said plate in a plurality of rotational orientations with respect to said plate;
   said front side of said plate having an integral, outwardly extending protective flange being dimensioned and arranged on said plate to protect said nipple and said intake hose from damage when attaching or removing the protective cowling of the motor; and said plate and said nipple having means for securing said nipple to said plate.

2. The thermostat cover assembly as defined in claim 1 wherein said nipple has a first section and a second section, said first section being integrally connected to said second section at an elbow, said first section being parallel to said plate and said second section being perpendicular to said plate when said nipple is secured to said plate with said nipple securing means.

3. The thermostat cover assembly as defined in claim 2 wherein said first section of said nipple has an open end having means for engaging said intake hose onto said nipple.

4. The thermostat cover assembly as defined in claim 2 wherein said second section of said nipple has a securing end configured to engage said nipple securing means of said plate.

5. The thermostat cover assembly as defined in claim 1 wherein said nipple has at least one inner channel which is in fluid communication with said intake hose and provides a passageway for the entry of the coolant through the thermostat control valve and into the cylinder bank.

6. The thermostat cover assembly as defined in claim 1 wherein said receiving means is a centrally located bore which, together with said nipple securing means, is adapted to receive and retain said nipple to permit the use of the thermostat cover assembly in a port or starboard application of the thermostat cover assembly to the motor.

7. The thermostat cover assembly as defined in claim 6 wherein said nipple includes an O-ring washer configured to form a sealing engagement with said bore when said nipple is secured to said plate.

8. The thermostat cover assembly as defined in claim 6 wherein said nipple securing means is a plurality of retractable ribs formed along said second section of said nipple, said ribs being configured and arranged to engage said rear side of said plate when said nipple is extended through said bore.

9. The thermostat cover assembly as defined in claim 1 wherein said plate includes fastening means for removably fastening the assembly to the cylinder bank.

10. The thermostat cover assembly as described in claim 1 wherein said plate includes gasket fastening means for fastening a sealing gasket to said rear side of said plate, said gasket configured to form a seal between said plate and the cylinder bank.

11. The thermostat cover assembly as defined in claim 10 wherein said gasket fastening means is a plurality of depending posts integrally formed on said rear side of said plate, said posts configured and arranged to matingly engage apertures formed through said gasket.

12. The thermostat cover assembly as defined in claim 1 wherein said plate further includes engagement means for engaging the thermostat spring to said rear side of said plate.

13. A thermostat assembly for the engine of an internal combustion motor, the motor being of the type having a cylinder assembly and an outer protective cowling, said assembly comprising:

thermostat means for modulating the quantity and the flow of coolant to the cylinders of the motor to maintain a predetermined coolant temperature throughout the motor during operation;

said thermostat means being securely mounted into a thermostat sleeve within the cylinder assembly and being in fluid communication with the cylinder assembly;

at least one intake nipple having a first end and a second end, said first end configured for engaging an intake hose;

said intake hose providing a supply of coolant to said thermostat means;

a mounting plate having a front side and a rear side, said rear side of said plate having means for engaging said thermostat means;

means for removably and selectively fastening said second end of said nipple to said plate in a plurality of rotational orientations relative to said plate; and means for releasably fastening said plate to the cylinder assembly, whereby said plate, said nipple and said intake hose are in fluid communication with said thermostat means and the cylinder assembly.

14. The thermostat assembly as defined in claim 13 wherein said thermostat means is a thermostatically actuated control valve.

15. The thermostat assembly as defined in claim 14 wherein said thermostatically actuated control valve includes a thermostat spring having an upper end removably attached to said rear side of said plate using said engagement means, said spring having a lower end removably attached to said thermostatically actuated control valve.

16. The thermostat assembly as defined in claim 13 wherein said nipple has at least one inner channel which is in fluid communication with said intake hose and provides a passageway for the entry of the coolant to said thermostat means and into the cylinder.

17. The thermostat assembly as defined in claim 13 wherein said nipple includes an integrated skirt formation and an O-ring washer configured to form a sealing engagement with said plate when secured with said nipple securing means.

18. The thermostat assembly as defined in claim 13 wherein said front side of said plate includes an integral, outwardly extending protective flange being dimensioned and arranged on said plate to protect said nipple and said intake hose from damage when attaching or removing the protective cowling of the motor.

19. A thermostat assembly for an internal combustion engine of the type used in marine propulsion devices, the engine having a cylinder assembly and an outer protective cowling, the thermostat cover comprising:

thermostat means for modulating the quantity and the flow of coolant to the cylinder assembly to maintain a predetermined coolant temperature throughout the engine while in operation.

said thermostat means being securely mounted into a thermostat sleeve set within the cylinder assembly, said thermostat means being in fluid communication with the cylinder assembly;

at least one intake nipple having a first end and a second end, said intake nipple including means integrally formed at said first end for releasably and sealingly engaging an intake hose;

said intake nipple having at least one inner channel which is in fluid communication with said intake hose and which provides a passageway for the entry of coolant to said thermostat means and into the cylinder assembly;

a mounting plate having a front side and a rear side, said mounting plate being configured with a bore provided through said plate and dimensioned to releasably accept and retain said intake nipple in a plurality of rotational orientations relative to said bore;

said intake nipple having snapping means for snappingly engaging said mounting plate once said second end is extended through said bore;

said intake nipple including an integral skirt formation and an O-ring seal configured and arranged to form a sealing engagement with said plate;

said plate having fastening means for releasably fastening said plate to the cylinder assembly, whereby said plate, said intake nipple and said intake hose are in fluid communication with said thermostat means and the cylinder assembly;

said front side of said plate having an integral, outwardly extending protective flange formed thereon, said flange being configured and arranged to protect said nipple and said intake hose from damage when attaching or removing the protective cowling from the engine;

said rear side of said plate having gasket fastening means for fastening a sealing gasket to said plate;

said gasket dimensioned to form a seal between said plate and the cylinder assembly;

said rear side of said plate further including thermostat spring engagement means integrally formed thereon for releasably engaging a thermostat spring; and said thermostat spring having an upper end removably attached to said thermostat spring engagement means and said thermostat spring having a lower end removably attached to said thermostat means.

20. The thermostat cover assembly as defined in claim 19 wherein said mounting plate and said intake nipple, being connected to said thermostat means with said thermostat spring, form a subassembly which can be assembled to and removed from the cylinder assembly as a unit.

* * * * *